B. ILLINGWORTH.
Mowing Machine.
No. 109,322. Patented Nov. 15, 1870.
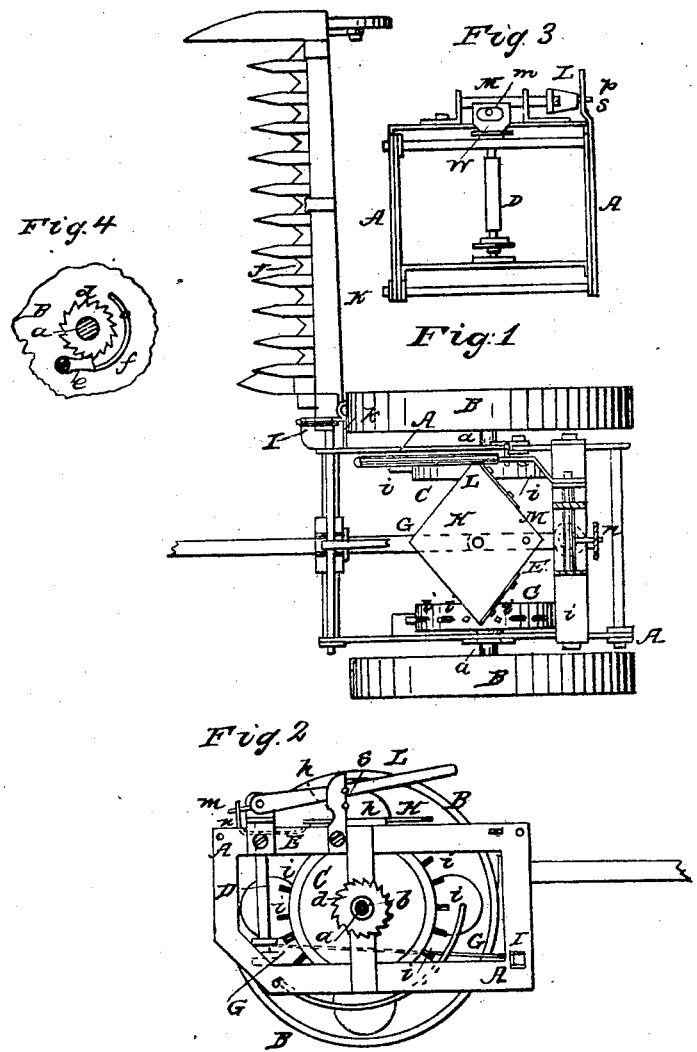
Witnesses
Inventor
Benjamin Illingworth

United States Patent Office.

BENJAMIN ILLINGWORTH, OF LE ROY, MINNESOTA.

Letters Patent No. 109,322, dated November 15, 1870.

IMPROVEMENT IN MOWING-MACHINES.

The Schedule referred to in these Letters Patent and making part of the same.

*To all whom it may concern:*

Be it known that I, BENJAMIN ILLINGWORTH, of Le Roy, in the county of Mower and in the State of Minnesota, have invented certain new and useful Improvements in Mowing-Machines; and do hereby declare that the following is a full, clear, and exact description thereof, reference being had to the accompanying drawing and to the letters of reference marked thereon making a part of this specification.

The nature of my invention consists in the construction and arrangement of a "mowing-machine," as will be hereinafter fully set forth.

In order to enable others skilled in the art to which my invention appertains to make and use the same, I will now proceed to describe its construction and operation, referring to the annexed drawing, in which—

Figure 1 is a plan view of my mowing-machine;

Figure 2 is a side elevation of the same, one wheel being removed;

Figure 3 is a rear view of the frame; and

Figure 4 is a view of the inner side of one of the wheels.

A represents the frame of my machine, through which passes the axle $a$.

Outside of the frame A, on each end of the axle, is secured a sleeve or collar, $b$, having, at its inner end, a toothed wheel, $d$.

On the collar $b$ is placed the wheel B, which, on its inner side, is provided with a pivoted pawl, $e$, pressed against the toothed wheel $d$, and so arranged that, when the machine moves forward, the axle $a$ will be turned or revolved with the wheels, but, when moving backward, the pawl $e$ will slide over the teeth of the wheel $d$, and not turn the axle.

Upon the axle $a$, inside and on each side of the frame A, is secured a wheel, C, provided, on its periphery, with a series of steel pins, $i$ $i$, placed at equal distances apart, and so arranged that each pin on one wheel will be directly opposite the center of the space between two pins on the other wheel.

Near the rear end, in the center of the frame A, is a vertical shaft, D, provided with two arms, one, E, at or near its upper end, and the other, G, at or near the lower end, both of said arms extending forward.

To the upper arm E is secured a horizontal diamond-shaped plate, H, the two rear sides of which are lined with steel bars $h$ $h$, which come in contact with the pins $i$ $i$, causing the plate to vibrate from side to side, giving the shaft D a rocking motion.

To the front end of the lower arm G is pivoted the pitman I, which passes out through the frame A, on the side, and is hinged to the sickle bar J.

The finger-bar K is hinged to the frame A, and can, with the sickle-bar, be turned up when it is held along the side, at the front edge of the machine, by the spring-hook $k$.

The vertical rocking-shaft D may be raised up for a short distance by means of a lever, L, attached to a shaft, M, placed horizontally in boxes on the rear end of the frame A.

From this shaft an arm, $m$, extends toward the rear, into and through a slotted ear, $n$, bent upward from the shaft D.

By this means the plate H will be raised up, so as to disengage it from the pins $i$ $i$.

The lever L is held in either position—that is, either to bring the plate H in or out of gear with the pins $i$ $i$, by means of a notched spring-bar, $p$, catching on a pin, $s$, on the side of the lever.

This machine, which I call the "eccentric diamond mower," has a great many very important advantages over other machines of its kind.

It dispenses with the usual complicated cog-wheeled gearing, the motion being generated by the square steel-lined plate H moving in a horizontal position from side to side.

The sickle is entirely free from any vibratory movement, as in the usual crank-gearing, and is not liable to break, as in other machines, the movement of the sickle in my machine being entirely horizontal.

The construction of the mower, in avoiding all vibration attendant on cog-gearing and crank movement, will render the machine much more durable and lessen the wear.

It will be of lighter draft than the ordinary mower, as the dynamic force required to move it will be about one-third less than other machines heretofore built.

The same mechanism, herein described, for operating the sickle-bar, may be employed in other machines, where a rapid reciprocating motion is desired.

Having thus fully described my invention,

What I claim as new, and desire to secure by Letters Patent, is—

1. The lever L, shaft M, arm $m$, and slotted ear $n$, all constructed and arranged as described, for throwing the plate H in and out of gear with the pins $i$ $i$, substantially as herein set forth.

2. The combination of the wheels C C, pins $i$ $i$, shaft D, arms E G, plate H, lever L, and shaft M, all constructed and arranged to operate substantially as and for the purposes herein set forth.

In testimony that I claim the foregoing, I have hereunto set my hand this 13th day of September, 1870.

BENJAMIN ILLINGWORTH.

Witnesses:
J. M. WYCKOFF,
JAMES F. TRASK.